United States Patent
Hundley et al.

(10) Patent No.: US 11,584,505 B1
(45) Date of Patent: Feb. 21, 2023

(54) PHONONIC COMPOSITE MATERIAL WITH INTERNAL RESONANT PHASES

(71) Applicant: HRL LABORATORIES, LLC, Malibu, CA (US)

(72) Inventors: Jacob M. Hundley, Newbury Park, CA (US); Eric C. Clough, Santa Monica, CA (US); Alan J. Jacobsen, Woodland Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 1053 days.

(21) Appl. No.: 16/268,117

(22) Filed: Feb. 5, 2019

Related U.S. Application Data

(62) Division of application No. 14/625,331, filed on Feb. 18, 2015, now abandoned.

(51) Int. Cl.
　　*G10K 11/168*　　(2006.01)
　　*B64C 1/40*　　(2006.01)
　　*G10K 11/162*　　(2006.01)

(52) U.S. Cl.
　　CPC .............. *B64C 1/40* (2013.01); *G10K 11/162* (2013.01); *G10K 11/168* (2013.01)

(58) Field of Classification Search
　　None
　　See application file for complete search history.

(56) References Cited

U.S. PATENT DOCUMENTS

| | | | |
|---|---|---|---|
| 7,137,444 B2 | 11/2006 | Faybishenko et al. | |
| 7,263,028 B2 | 8/2007 | Thomas et al. | |
| 8,616,330 B1 * | 12/2013 | McKnight | G10K 11/16 181/207 |
| 2006/0137799 A1 | 6/2006 | Haque et al. | |
| 2012/0090916 A1 | 4/2012 | Berker et al. | |
| 2013/0025961 A1 | 1/2013 | Koh et al. | |
| 2013/0025965 A1 | 1/2013 | Miyake et al. | |
| 2014/0027201 A1 | 1/2014 | Islam et al. | |
| 2015/0219078 A1 | 8/2015 | Li et al. | |
| 2016/0203812 A1 | 7/2016 | Wilson et al. | |

OTHER PUBLICATIONS

Chen et al., "Dynamic behaviour of sandwich structure containing spring-mass resonators," Composite Structures, 93:2120-2125, 2011.
Complete Textile Glossary, Celanese Acetate, 2001, "fiber" entry, p. 61.

(Continued)

*Primary Examiner* — Alexander S Thomas
(74) *Attorney, Agent, or Firm* — Lewis Roca Rothgerber Christie LLP

(57) ABSTRACT

A phononic composite material providing structural strength and blocking the propagation of elastic waves over a frequency range referred to as the bandgap. In one embodiment, the phononic composite material consists of a plurality of periodic units, each of which includes a central fiber, a relatively soft interface layer surrounding the fiber, and a matrix layer surrounding the interface layer. The properties of the interface layer may be adjusted, e.g., by adjusting the temperature of the phononic composite material, to transition from a state with a bandgap to a state lacking a bandgap.

19 Claims, 14 Drawing Sheets

(56) References Cited

OTHER PUBLICATIONS

Lai et al., "Hybrid elastic solids," Nature Materials, vol. 10, pp. 620-624, Aug. 2011.
Liu et al., "Locally Resonant Sonic Materials," Science, 289:1734-1736, Sep. 8, 2000.
Reichmanis et al., "Photopolymer Materials and Processes for Advanced Technologies," (2014), Chem. Mater. 26: 533-548.
Robillard et al., "Tunable magnetoelastic phononic crystals," Applied Physics Letters, 95, 124104, 2009.
Tan et al., "Blast-wave impact mitigation using negative effective mass density concept of elastic metamaterials," International Journal of Impact Engineering, 64:20-29, 2014.
Wang et al., "Mechanically tunable phononic band gaps in three-dimensional periodic elastomeric structures," International Journal of Solids and Structures, 49:2881-2885, 2012.

* cited by examiner

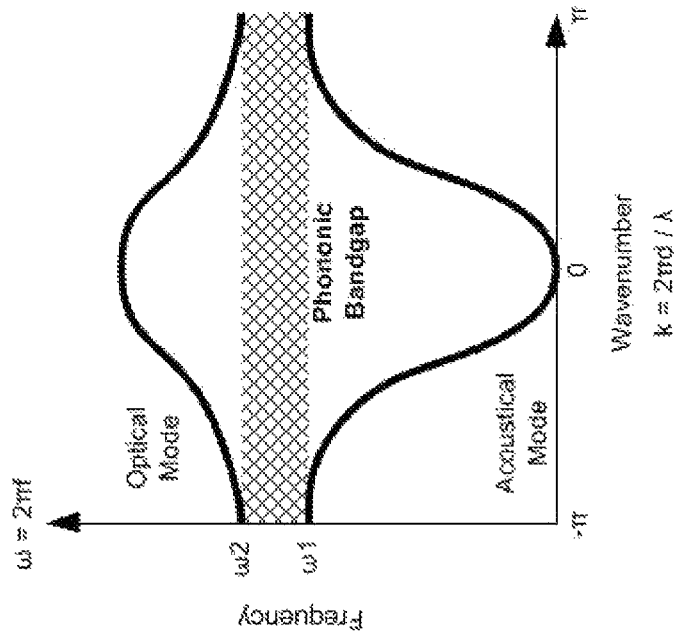
FIG. 4C
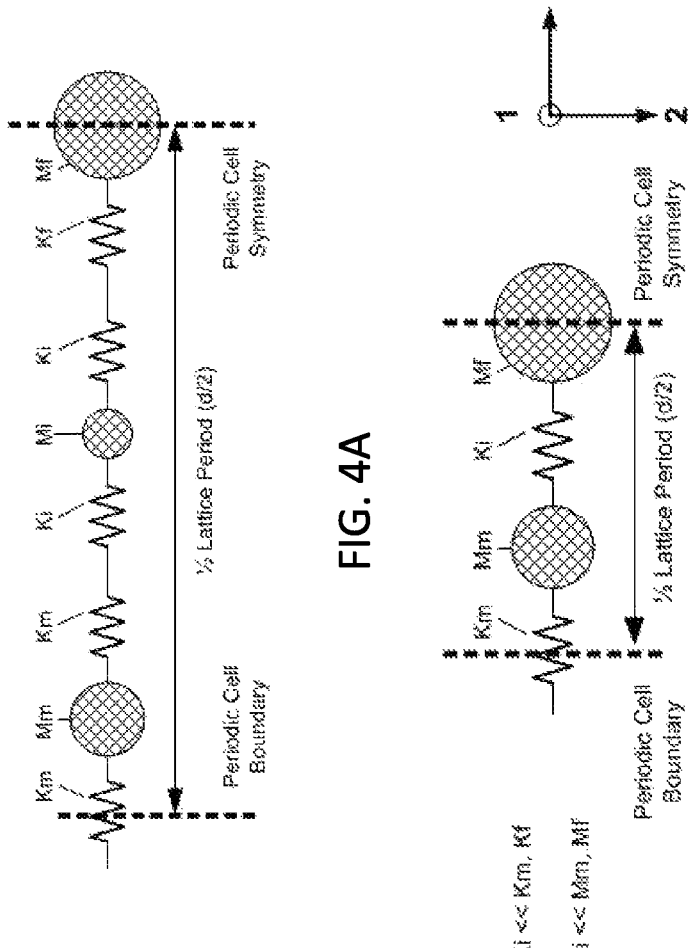
FIG. 4A
FIG. 4B

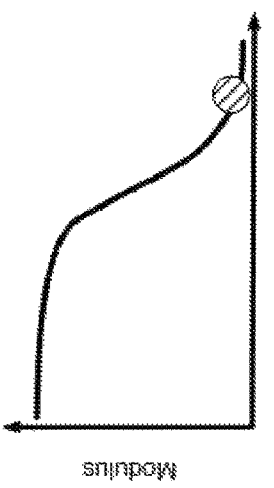
FIG. 6A
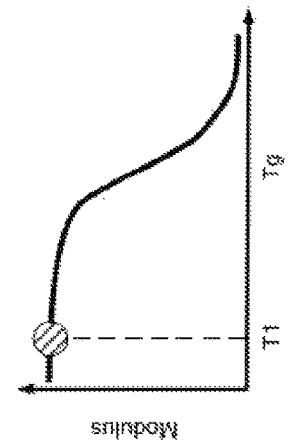
FIG. 6B
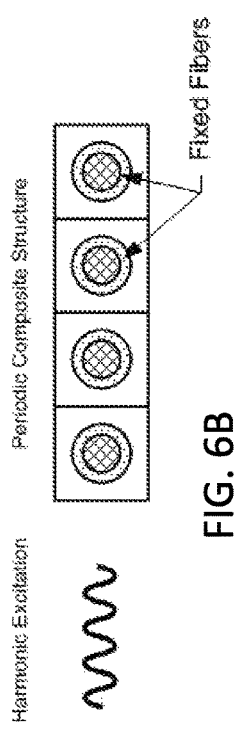
FIG. 6C
$T_1 < T_g$
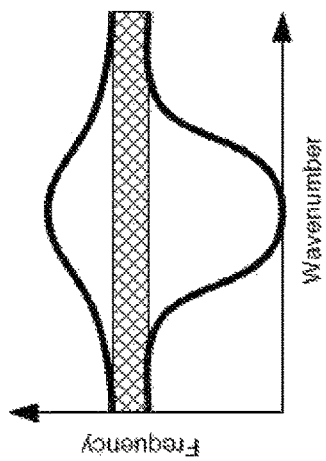
FIG. 6D
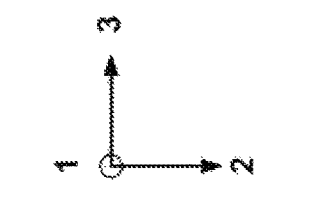
$T_2 > T_g$
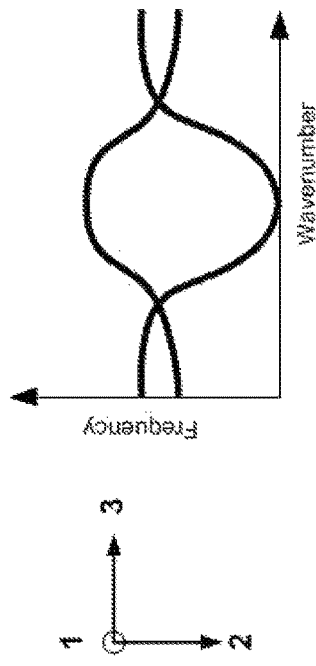
FIG. 6E
FIG. 6F

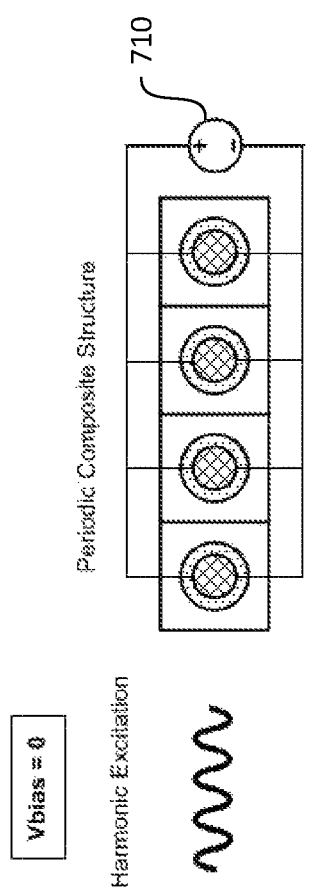
FIG. 7A
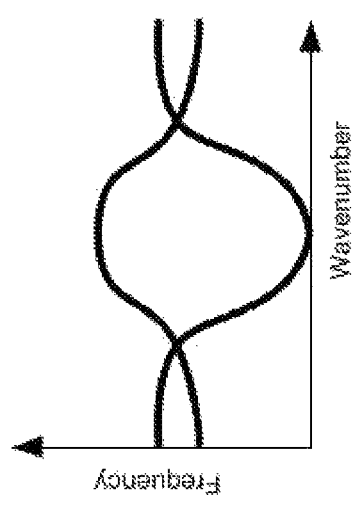
FIG. 7B
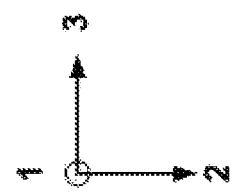

PHONONIC COMPOSITE MATERIAL WITH INTERNAL RESONANT PHASES

CROSS-REFERENCE TO RELATED APPLICATION(S)

The present application is a divisional of U.S. patent Application Ser. No. 14/625,331, filed on Feb. 18, 2015, now abandoned, the entire content of which is incorporated herein by reference.

FIELD

One or more aspects of embodiments according to the present invention relate to attenuation of elastic waves, and more particularly to a composite material having both structural stiffness and an ability to block elastic waves over a frequency band.

BACKGROUND

In situations in which a vibration-sensitive instrument must be secured to a mechanically noisy platform, such as an aircraft airframe, the structure utilized to support the instrument may face the competing requirements that the support structure be sufficiently rigid to support the mass of the instrument, but that it also be sufficiently soft, or compliant, to attenuate vibrations in the platform. Commercially available support structures generally fall into one of two categories, i.e., either stiff support, or compliant support, each lacking one of the two desired characteristics, or a commercially available support structure may be a compromise lacking both characteristics to some extent.

Thus, there is a need for a system for providing structural stiffness and simultaneously attenuating mechanical noise, e.g., vibrations.

SUMMARY

Aspects of embodiments of the present disclosure are directed toward a phononic composite material providing structural stiffness and blocking the propagation of elastic waves over a frequency range referred to as the bandgap. In one embodiment, the phononic composite material consists of a plurality of periodic units, each of which includes a central fiber, a relatively soft interface layer surrounding the fiber, and a matrix layer surrounding the interface layer. The properties of the interface layer may be adjusted, e.g., by adjusting the temperature of the phononic composite material, to transition from a state with a bandgap to a state lacking a bandgap.

According to an embodiment of the present invention, there is provided a phononic composite material including: a plurality of periodic units, each of the periodic units having a length in a first direction, a width in a second direction, and a periodic unit height in a third direction, the length being at least 10 times greater than the height and at least 10 times greater than the width; each of the periodic units including a fiber, an interface layer surrounding the fiber, and a matrix phase surrounding the interface layer, the interface layer capable of being in a first state; the periodic units being contiguous with one another to form a structure, the structure having a structure height and being periodic in the second direction; and the periodic unit height, the width, a Young's modulus of the interface layer in the first state, an average thickness of the interface layer, an average diameter of the fiber, a density of the fiber, and the structure height being configured with each other to block propagating elastic waves in arbitrary directions perpendicular to the first direction over a contiguous range of frequencies in the phononic composite material.

In one embodiment, the interface layer is capable of being in a second state, a Young's modulus of the interface layer in the second state being at least 3 times greater than the Young's modulus of the interface layer in the first state.

In one embodiment, the fiber includes, as major component, a discontinuous material.

In one embodiment, the fiber includes, as a major component, a material selected from the group consisting of short fibers, particulates, flakes, and combinations thereof.

In one embodiment, the fiber includes, as a major component, a material selected from the group consisting of tungsten or its alloys, copper or its alloys, steel, glass, carbon, alumina, silicon carbide, aluminum, boron, and combinations thereof.

In one embodiment, the matrix phase includes, as a major component, a material selected from the group consisting of thermosetting polymers, thermoplastic polymers, elastomeric polymers, metals, metal alloys, engineered ceramics, and combinations thereof.

In one embodiment, the interface layer includes, as a major component, a material selected from the group consisting of thermosetting polymers, thermoplastic polymers, elastomeric polymers, metals, metal alloys, engineered ceramics, and combinations thereof.

In one embodiment, the interface layer and the matrix phase are composed of the same material.

In one embodiment, the interface layer includes, as a major component, a cellular solid.

In one embodiment, the interface layer includes, as a major component, a cellular solid selected from the group consisting of foams, micro-trusses, and combinations thereof.

In one embodiment, a periodic unit of the plurality of periodic units contains more than one interface layer.

In one embodiment, for each of the plurality of periodic units: the fiber is in the center of the periodic unit; the interface layer surrounds the fiber and is concentrically arranged around the fiber; and the matrix phase surrounds the interface layer and is concentrically arranged around the interface layer.

In one embodiment, each of the plurality of periodic units is rectangular.

In one embodiment, a periodic unit of the plurality of periodic units contains more than one fiber.

In one embodiment, a periodic unit of the plurality of periodic units has a first cross section at a first point along the length of the periodic unit and a second cross section at a second point along the length of the periodic unit, the first cross section being different from the second cross section.

In one embodiment, the periodic units are arranged in a square packing.

In one embodiment, the periodic units are arranged in a hexagonal packing.

In one embodiment, the plurality of periodic units includes a first plurality of periodic units each having a first cross section and a second plurality of periodic units each having a second cross section, the first cross section being different from the second cross section.

In one embodiment, a first periodic unit of the plurality of periodic units has a value for a parameter selected from the group consisting of the periodic unit height, the width, an average thickness of the interface layer, and an average diameter of the fiber, differing from the value of the parameter for a second periodic unit of the plurality of periodic units.

In one embodiment, the contiguous range of frequencies is within a frequency range of 20 Hz-20 kHz.

In one embodiment, the contiguous range of frequencies is within a frequency range of 20 kHz-2 MHz.

In one embodiment, the contiguous range of frequencies is within a frequency range of 2 MHz-1 GHz.

In one embodiment, the phononic composite material includes a source or sink of heat configured to raise or lower a temperature of the interface layer of a periodic unit of the plurality of periodic units.

In one embodiment, the fiber of the periodic unit includes a conductive material, and the source or sink of heat includes a source of electrical current configured to drive an electrical current through the fiber of the periodic unit.

In one embodiment, the source or sink of heat includes a Peltier junction.

In one embodiment, the interface layer includes, as a major component, a UV-curable photopolymer.

In one embodiment, the source or sink of heat is configured to raise a temperature of the interface layer above a glass transition temperature of the interface layer, or to lower the temperature of the interface layer below a glass transition temperature of the interface layer.

In one embodiment, the source or sink of heat includes a source of radio frequency or microwave energy.

In one embodiment, the fiber of a first periodic unit of the plurality of periodic units includes, as a major component, a first material, and the fiber of a second periodic unit of the plurality of periodic units includes, as a major component, a second material, the first material being different from the second material.

In one embodiment, the interface layer of a first periodic unit of the plurality of periodic units includes, as a major component, a first material, and the interface layer of a second periodic unit of the plurality of periodic units includes, as a major component, a second material, the first material being different from the second material.

In one embodiment, the periodic units are packed with hexagonal packing.

BRIEF DESCRIPTION OF THE DRAWINGS

These and other features and advantages of the present invention will be appreciated and understood with reference to the specification, claims and appended drawings wherein:

FIG. 4A is a schematic diagram of a one-dimensional model of a phononic composite material, according to an embodiment of the present invention;

FIG. 4B is a schematic diagram of another one-dimensional model of a phononic composite material, according to an embodiment of the present invention;

FIG. 4C is a graph of dispersion curves for a phononic composite material, according to an embodiment of the present invention;

FIG. 6A is a graph of elastic modulus as a function of temperature for an interface layer material, according to an embodiment of the present invention;

FIG. 6B is a cross-sectional view of a phononic composite material, illustrating fixed fibers, according to an embodiment of the present invention;

FIG. 6C is a graph of dispersion curves for a phononic composite material, according to an embodiment of the present invention;

FIG. 6D is a graph of elastic modulus as a function of temperature for an interface layer material, according to an embodiment of the present invention;

FIG. 6E is a cross-sectional view of a phononic composite material, illustrating resonant fibers, according to an embodiment of the present invention;

FIG. 6F is a graph of dispersion curves for a phononic composite material, according to an embodiment of the present invention;

FIG. 7A is a cross-sectional view of a phononic composite material, with a schematic illustration of a system for heating the fibers of the phononic composite material by causing electrical current to flow through them, according to an embodiment of the present invention;

FIG. 7B is a graph of dispersion curves for a phononic composite material at low temperature, before the fibers have become heated by the electrical current, according to an embodiment of the present invention;

DETAILED DESCRIPTION

The detailed description set forth below in connection with the appended drawings is intended as a description of exemplary embodiments of a phononic composite material with internal resonant phases provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Embodiments of this invention pertain to a multi-functional structural material which serves to block, redirect, or focus the propagation of elastic waves within a frequency band referred to herein as the "bandgap". This material, which contains two or more dissimilar component materials or "phases" (having different material properties, e.g., different densities and/or different elastic moduli) arranged in a periodic pattern, may be termed a "phononic crystal" or a "sonic crystal", terms that arise from similarities in the manner in which phononic and photonic crystals interact with elastic and electromagnetic waves, respectively. A phononic crystal with a phononic bandgap may, for example, prevent phonons of selected ranges of frequencies from being transmitted through the material.

Figure 1:
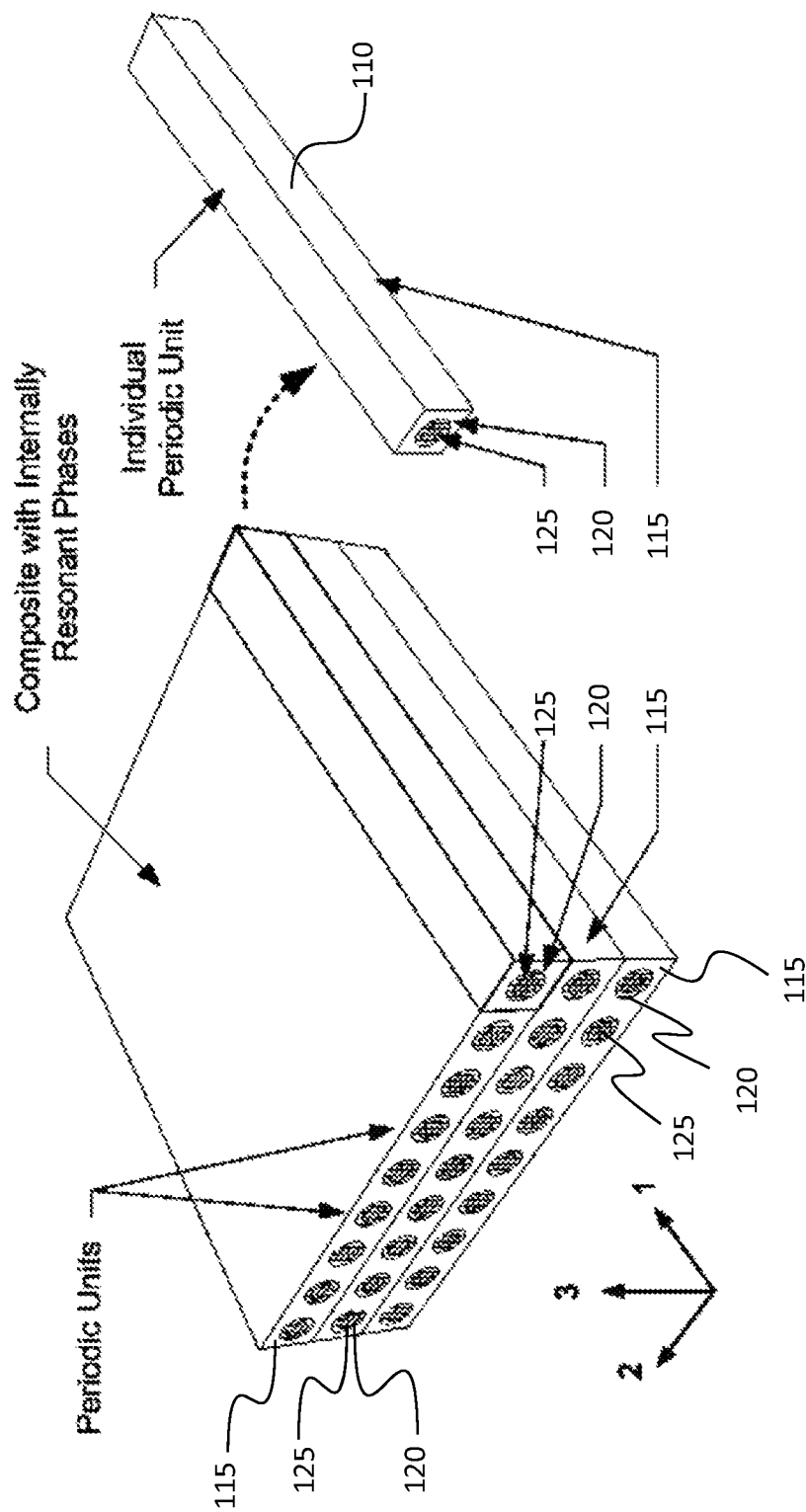
FIG. 1 is a perspective view of a phononic composite material, according to an embodiment of the present invention.
Figure 2:
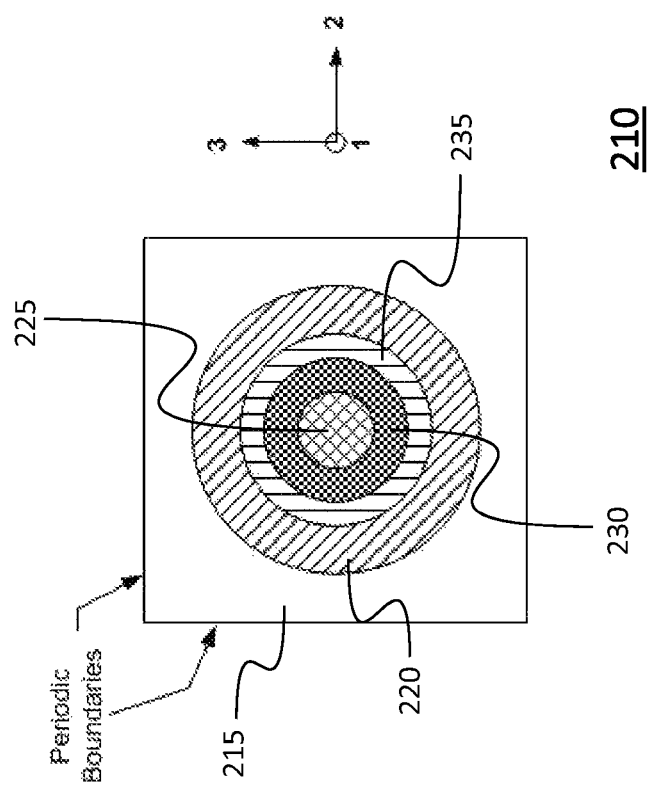
FIG. 2 is a cross-sectional view of a periodic unit of a phononic composite material, according to another embodiment of the present invention.
Figure 3A:
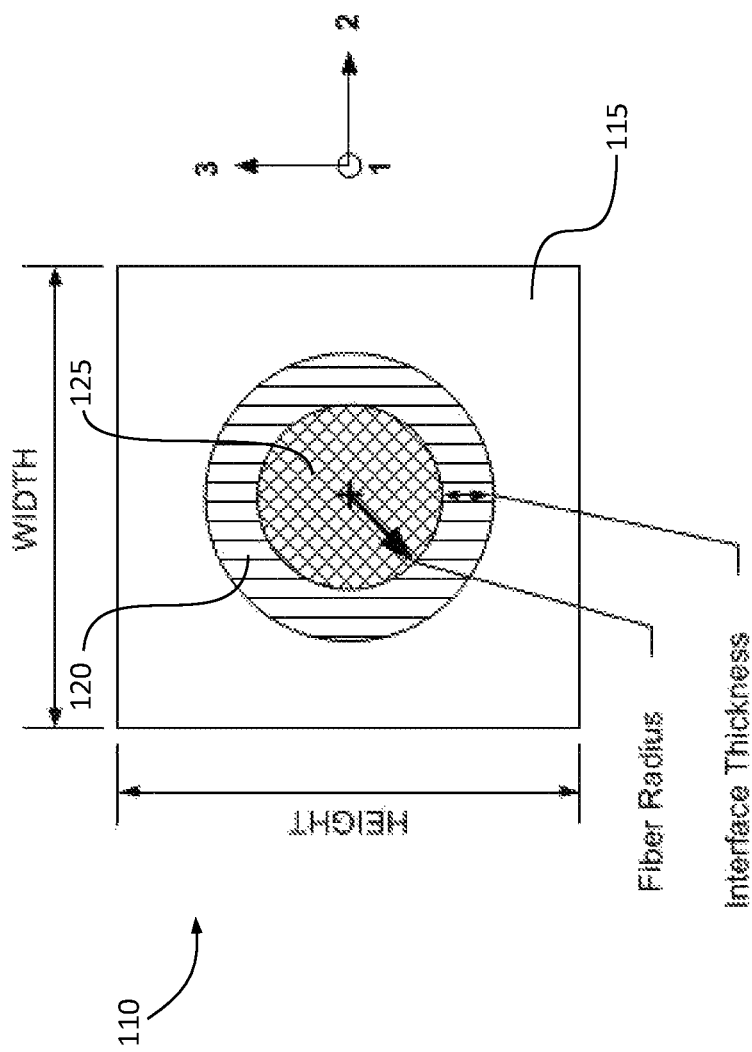
FIG. 3A is a cross-sectional view of a periodic unit of the phononic composite material of FIG. 1, according to another embodiment of the present invention.

Locally resonant phononic crystals are a specific class of the multi-functional structural materials, in which one or more phases of the local structure are capable of motion relative to the "bulk" displacement of the material. Referring to FIG. 1, in one embodiment, a three-phase phononic composite material is composed of a plurality of periodic units 110 forming a periodic structure. Referring to FIG. 3A, each periodic unit 110 includes (e.g., consists of) a matrix phase 115; an interface layer 120, or "interface phase" 120, within, and connected to, the matrix phase 115; and a fiber 125 contained within, and connected to, the interface layer 120. In additional embodiments, each periodic unit 110 may contain multiple matrix phases 115, interface layers 120, and/or fibers 125. An example of this is shown in FIG. 2, in which the periodic unit 210 includes an outer matrix phase 215; a first, central fiber 225; a first interface layer 220 inside the matrix phase 215; a second interface layer 230 surrounding the first fiber 225; and a second fiber 235 inside the first interface layer 220 and surrounding the second interface layer 230. In one embodiment, shown in FIG. 2, the first and second fibers 225, 235 and the first and second interface layers 220, 230 are all solid or hollow cylinders, and they are all mutually concentric. In other embodiments, the first and second fibers 225, 235 and the first and second interface layers 220, 230 may have cross sections that are not circular, e.g., they may be square, rectangular, hexagonal, elliptical, or irregular, and they may not be concentric, e.g., a central axis of one of these elements may be offset from a central axis of another of these elements.

Each periodic unit 110 has a height, a width, and a length defined by the periodic spacing of the periodic units, e.g., the width may be equal to the center-to-center spacing of the fibers 125 in direction 2 as defined by the coordinate system axes shown in FIG. 1. In the embodiments of FIGS. 1 and 3A, the height is measured along a vertical direction in FIG. 3A, i.e., direction 3 as defined by the coordinate system axes shown, the width is measured along a horizontal direction in FIG. 3A, i.e., direction 2 as defined by the coordinate system axes shown, and the length is measured along a direction parallel to the long dimension of the periodic units 110, i.e., direction 1 as defined by the coordinate system axes shown. A structure composed of periodic units 110 may also have a height, a width, and a length, which may be defined in the same directions as the corresponding dimensions of the periodic units. The characteristics of the structure may depend on its dimensions, e.g., on the height of the structure, or on the number of periodic units in the structure in the height direction (direction 3). For example, the structure illustrated in FIG. 1 has three periodic units in the height direction (or third direction).

Figure 3B:
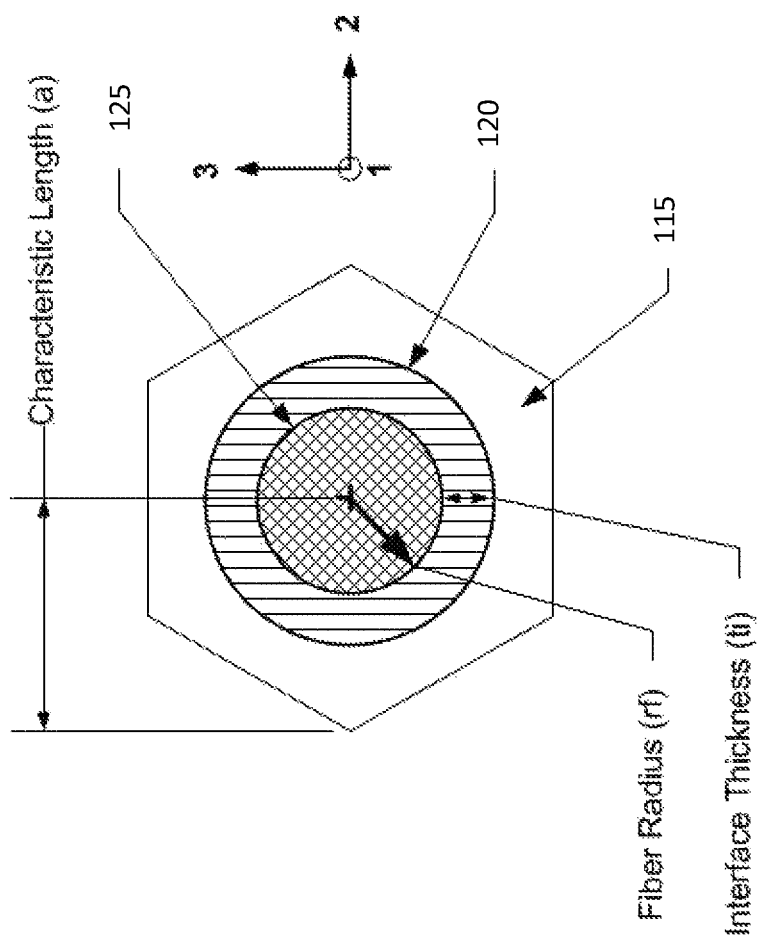
FIG. 3B is a cross-sectional view of a periodic unit of a phononic composite material, according to another embodiment of the present invention.

In the embodiments of FIGS. 1, 3A, and 3B, the interface layers 120 are compliant and allow the fibers 125 to move relative to the matrix phase 115. These internal degrees of freedom allow for localized motion within the periodic unit 110 with corresponding minimal displacement at the boundaries of the phononic composite material. For suitably selected materials and dimensions, this produces a frequency band, referred to as a bandgap, or "phononic bandgap", in which elastic waves are blocked, i.e., will not propagate through the material. The center frequency, or "bandgap frequency", may correspond to elastic wavelengths several orders of magnitude larger than the period of the phononic composite material, i.e., the spacing between adjacent periodic units 110. This behavior differs from Bragg scattering in non-locally resonant periodic structures where the wavelength of interaction and period of the structure must be of the same size. Thus, with embodiments of the present invention, blocking of elastic waves in the acoustic regime (20 Hz-20 kHz) can be achieved in a relatively small package size, on the order of centimeters. The width of the bandgap, or "bandwidth" or "bandgap width", may be influenced by various parameters of the phononic composite material discussed further below.

In addition to acting as masses that may resonate within the phononic composite material, the fibers 125 may, if composed of a suitable material, significantly enhance the structural stiffness of the phononic composite material. The fibers 125 may provide stiffness to mitigate deformation from, for example, bending moments perpendicular to the direction of the fibers 125 (e.g., direction 1 in FIG. 1 or in FIG. 3A), or to hoop stresses, if a sheet of the phononic composite material is formed into a tube with the fibers 125 running circumferentially.

Referring again to FIG. 3A, in one embodiment, each periodic unit 110 of the phononic composite material includes (e.g., consists of) a fiber 125 with a circular cross section, an interface layer 120 with an annular cross section, and a matrix phase 115 with a cross section having a circular inner boundary and an outer boundary corresponding to the spatial arrangement of periodic cells, e.g., square packing in FIG. 1. In other embodiments, the (outer) boundary of the cross section of the fiber 125 has a different shape, e.g., square, rectangular, ellipsoidal, hexagonal, or an irregular geometry. In one embodiment, the inner boundary of the cross section of the interface layer 120 is the same as the outer boundary of the cross section of the fiber 125 (i.e., the interface layer 120 and the fiber 125 are in contact at this surface), and the outer boundary of the cross section of the interface layer 120 is, e.g., square, rectangular, ellipsoidal, hexagonal, or an irregular geometry. In one embodiment, the inner boundary of the cross section of the matrix phase 115 is the same as the outer boundary of the cross section of the interface layer 120 (i.e., the matrix phase 115 and the interface layer 120 are in contact at this surface). The shape of the outer boundary of the cross section of the interface layer 120 may be independent of the shape of the outer boundary of the cross section of the fiber 125 and thus the interface layer 120 may possess non-uniform thickness around the perimeter of the fiber 125, for example, if the outer boundary of the cross section of the fiber 125 is circular and the outer boundary of the cross section of the interface layer 120 is square. The packing of periodic units 110 in the phononic composite material may be square as shown in FIGS. 1 and 3A, or it may be hexagonal as shown in FIG. 3B, or it may be rectangular. Referring to FIG. 3B, for a hexagonal periodic unit, the width of the periodic unit may be twice the characteristic length shown FIG. 3B, and the height may be the characteristic length times the square root of 3, or, if the orientation differs from that illustrated by 30 degrees, then the height of the periodic unit may be twice the characteristic length shown FIG. 3B, and the width may be the characteristic length times the square root of 3. In one embodiment, each periodic unit includes several fibers and interface layers arranged in an irregular fashion within the periodic unit.

In the embodiment of FIG. 1, the phononic composite material is prismatic, i.e., the cross section is constant along a direction parallel to the length dimension of the periodic units 110, which is direction 1 as defined by the coordinate system axes shown in FIGS. 1 and 3A. In other embodiments, the periodic units 110 may be non-prismatic; for example, the matrix phase 115, interface layer 120, and/or fibers 125 may taper or vary along the length direction of the phononic composite material such that the composite cross section is not constant in the length direction.

In one embodiment, the fiber 125 is continuous and straight; in other embodiments, it may be woven, knit, or braided. In other embodiments it may be discontinuous, e.g., composed of particulates, short fibers, or flakes.

For a bandgap within the audio frequency range (20 Hz-20 kHz), the dimensions of the phononic composite material may be in the following ranges: periodic unit 110 height: 0.5-50 mm, periodic unit 110 width: 0.5-50 mm, radius (rf) of the fiber 125: 0.05-20 mm, and thickness (ti) of the interface layer 120: 0.01-5 mm. In each case the periodic unit length may be arbitrary.

In other embodiments, phononic composite materials with bandgaps above the audio frequency range may be formed by reducing the dimensions of the phononic composite material. For example, for bandgaps in the MHz or GHz frequency bands, the dimensions of the phononic composite material may be in the following ranges: periodic unit 110 height: 2-500 µm, periodic unit 110 width: 2-500 µm, radius of the fiber 125: 0.05-50 µm, and thickness of the interface layer 120: 0.1-10 µm. The characteristic geometry of such a phononic composite material would be in line with that of a typical unidirectional, continuous fiber-reinforced structural composite ply.

Referring to FIG. 4A, for a one-dimensional, single degree of freedom system, the phononic composite material of embodiments of the present invention shown in FIGS. 1 and 3A can be idealized as an effective spring-mass network, where losses or damping are neglected in each of the phases. Assuming that the mass and stiffness of the interface layer 120 are much lower than those of the fiber 125 and the matrix phase 115, the system can be approximated utilizing Born's lattice model as shown in FIG. 4B. In this approximation, a bandgap exists between the "acoustical" and "optical" elastic modes in the lattice, corresponding to the lack of intersection between the dispersion curves of FIG. 4C. As utilized herein, "optical" modes are elastic (not electromagnetic) wave modes, for which the motion of the fiber 125 is about 180 degrees out of phase with the motion of the matrix phase 115; "acoustical" modes are elastic wave modes for which the motion of the fiber 125 is approximately (or about) in phase with the motion of the matrix phase 115. The location and width of the bandgap are influenced by the internal resonance of the fiber 125 mass with the interface layer 120 spring system, or "fiber-interface system", within the periodic phononic composite material. A characteristic resonant frequency, defined as the square root of the ratio of (i) the spring constant of the interface layer 120 (per unit length) to (ii) the mass of the fiber 125 (per unit length), provides a measure of the extent to which the bandgap frequency may be driven below the Bragg scattering limit, with a lower characteristic resonance frequency resulting, generally, in a lower bandgap frequency.

Significantly increasing the mass per unit length of the fiber 125 may be challenging, but, in embodiments of the present invention, the spring constant per unit length of the interface layer 120 may, in some cases, more readily be adjusted to achieve a target characteristic resonant frequency and a bandgap at a target frequency.

In one embodiment, an elastic modulus, e.g., the Young's modulus, of the material of the interface layer 120 is tuned by heating the interface layer 120 either with an electrical or thermal stimulus. For interface layer materials with temperature-dependent mechanical properties, this may produce a change in the elastic moduli which, coupled with the thickness of the interface layer 120, dictate the effective spring constant of the interface layer 120.

For example, an elastic modulus of the material of the interface layer 120 may be modified by utilizing, for the material of the interface layer 120, a thermosetting polymer material with a controllable glass transition temperature (Tg). Below the Tg temperature, the stiffness of the interface layer 120 is high, allowing the interface layer 120 to efficiently transfer loads between the matrix phase 115 and the fiber 125. Above the Tg temperature, the stiffness of the interface layer 120 is significantly reduced, which lowers the characteristic resonant frequency and the bandgap frequency.

Figure 5:
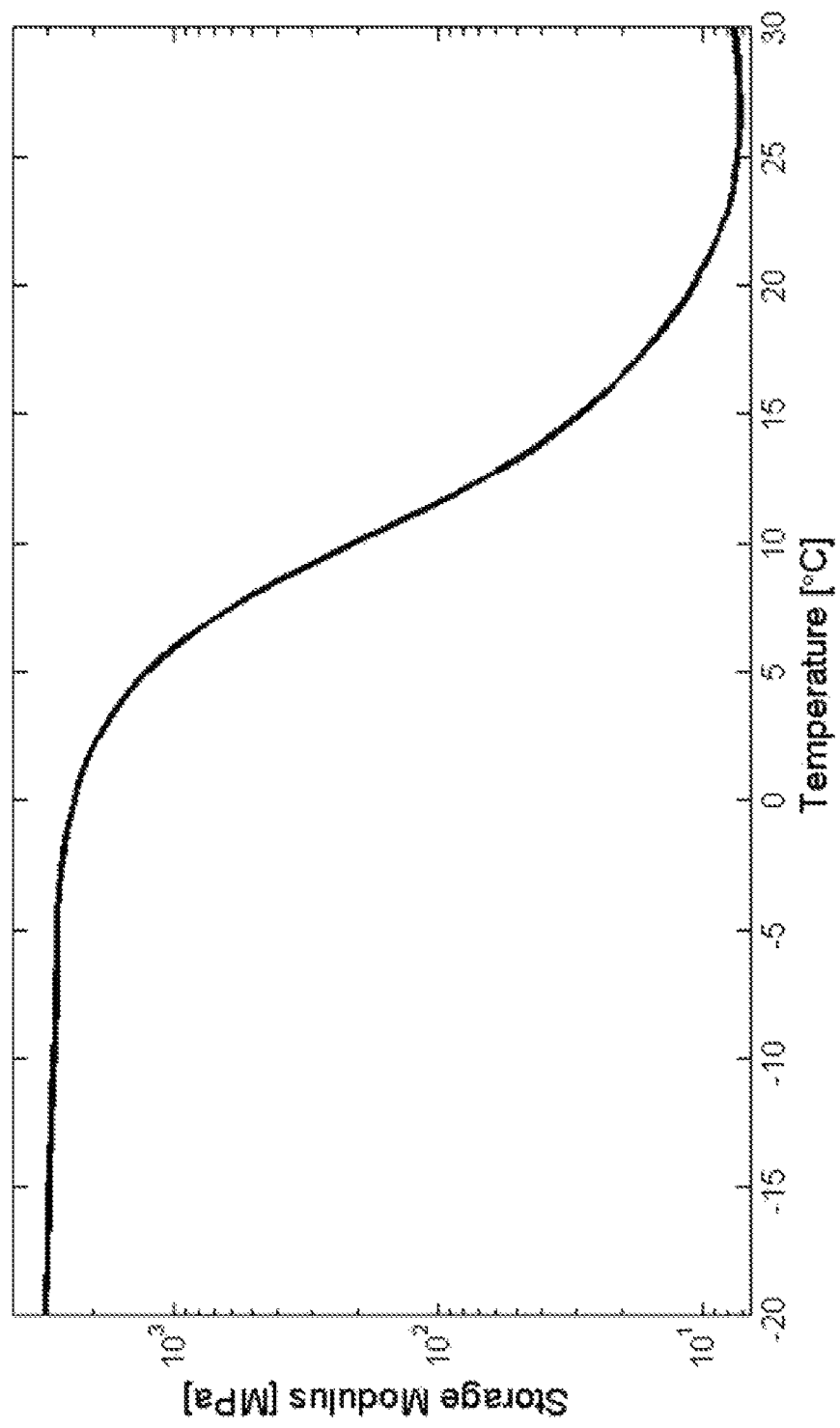
FIG. 5 is a graph of elastic modulus as a function of temperature for an interface layer material, according to an embodiment of the present invention.

An exemplary interface layer material with several orders of magnitude difference in the elastic moduli of the interface layer material is shown in FIG. 5. The storage modulus versus temperature data in FIG. 5 was obtained from dynamic mechanical analysis (DMA) of a UV-cured photopolymer interface layer material with a Tg equal to 10° C. The interface layer material may, in other embodiments, be any other material with a sufficient change in elastic properties as a function of temperature in the range of ~100° C. to 200° C. The interface layer material may be or include crystalline or semi-crystalline thermoplastic polymers, phase change materials, or low melting point metals.

The stiffness of the interface layer 120, and hence the bandgap frequency and bandwidth, may be controlled in a global manner (i.e., all periodic units 110) or in a local manner (e.g., by arranging for the periodic units in the phononic composite material to be individually addressable and controlling the periodic units in the phononic composite material individually). Referring to FIGS. 6A-6C, at a first, relatively low, temperature T1<Tg, the interface layer 120 is relatively stiff, i.e., the elastic moduli of the interface layer material are high, so that each fiber 125 is essentially fixed in the corresponding matrix phase 115. The phononic composite material does not show a bandgap, as evidenced by the overlapping dispersion curves in FIG. 6C. To introduce a phononic bandgap in the entire phononic composite material structure, the phononic composite material may be heated up to a relatively high temperature T2 greater than the Tg of the interface layer material, so that the interface layer 120 is relatively soft, i.e., the elastic moduli of the interface layer material are low, allowing the fibers 125 to resonate in response to a harmonic excitation as shown in FIGS. 6D-6F. In this high temperature state a bandgap is present, as evidenced by the non-overlapping dispersion curves in FIG. 6F. The temperature of the entire phononic composite material structure may then be utilized to control the bandgap frequency, with the greatest change in the properties of the phononic composite material with temperature obtained at or near the glass transition temperature of the interface layer material. In one embodiment of this invention, all periodic units 110 have interface layers 120 with the same Tg; in other embodiments, the Tg of the interface layer 120 varies spatially within the phononic composite material.

Figure 7C:
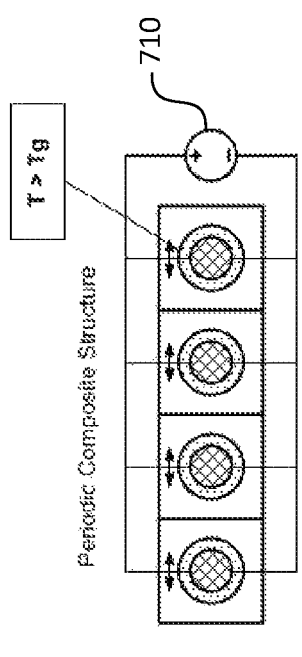
FIG. 7C is a cross-sectional view of a phononic composite material, with a schematic illustration of a system for heating the fibers, after the fibers have become heated by the electrical current and illustrating resonant fibers, according to an embodiment of the present invention.
Figure 7D:
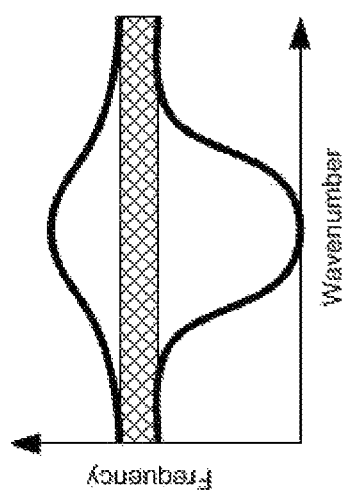
FIG. 7D is a graph of dispersion curves for a phononic composite material at high temperature, after the fibers have become heated by the electrical current, according to an embodiment of the present invention.

In other embodiments, the bandgap frequency and bandwidth in the phononic composite material is modified by individually addressing a subset of periodic units 110 through electrical resistive (ohmic) heating. If conductive (or resistive) fibers 125 are utilized, applying a bias voltage from a source 710 of electrical current to a plurality of fibers 125 in the composite, as illustrated in FIGS. 7A and 7C, may result in heating of the interface layer 120, softening of the interface layer 120, and a change in state from an initial state, in which the interface layer 120 is relatively stiff and the phononic composite material does not exhibit a bandgap (FIG. 7B) to a state, once the interface layer 120 has been sufficiently heated, in which the interface layer 120 is relatively soft and the phononic composite material does exhibit a bandgap (FIG. 7D). Once the temperature at the interface layer 120 exceeds the Tg, the applied voltage may be controlled to maintain this temperature and the associated bandgap frequency of the fiber-interface system. In one embodiment, the frequency of the bandgap is adjusted or controlled by varying the heating current driven through the fibers 125. If the matrix phase 115 surrounding the interface layer 120 is of sufficiently low thermal conductivity, the individual fiber 125 units may be thermally isolated from one another. Otherwise, a temperature control device such as a Peltier junction can be incorporated into the phononic composite material structure, e.g., the Peltier junction may be secured to one surface of the phononic composite material structure to act as a source or sink of heat, i.e., to pump heat into or out of the material. In other embodiments, other sources or sinks of heat may be utilized to heat or cool the interface layers 120 of the phononic composite material, such as sources of radio frequency or microwave energy, or direct contact between a hot or cold heat source or sink and one or more of the fibers 125.

Various materials may be utilized for the phases of the phononic composite material. The phononic composite material may have high stiffness, low effective mass, a bandgap in the audio frequency range, and periodic units 110 having a height and a width much smaller than the Bragg scattering limit. For the fiber 125, materials which are high stiffness and strength may be utilized, e.g., to enhance the strength of the phononic composite material. High fiber material density may be beneficial in providing a low resonant frequency of the fiber-interface system and a low bandgap frequency, but high fiber 125 material density may also result in a high average density for the phononic composite material, which may be undesirable. Thus, a material may be selected for the fiber 125 with a density that is an acceptable compromise between these consequences. The fiber material may be an organic material such as an aramid or polyethylene. In other embodiments, the fiber 125 material is an inorganic material such as tungsten, a tungsten alloy, steel, copper, brass, boron, aluminum, carbon, or a mixture, composite, or combination (e.g., alloy) thereof. In other embodiments, the inorganic fiber material may be an engineered ceramic such as glass, alumina, silicon carbide, high graphitic alignment carbon, or a mixture, composite, or combination thereof.

The interface layer material in the phononic composite material may be selected based in part on the desired temperature at which a stiffness change occurs (e.g., the glass transition temperature or melting point). The stiffness values of the interface layer material above and below this temperature also may affect the selection of a material for the interface layer 120, as they govern the characteristic resonant frequency of the fiber-interface system and determine the amount of load transfer between the matrix phase 115 and fiber 125, which may affect the strength and stiffness of the phononic composite material. In some instances, it is desirable to have the transition temperature range be as narrow as possible, allowing the phononic composite material to behave as an acoustic switch, which blocks elastic waves in a first, high temperature state, and transmits them in a second, low-temperature state. In other circumstances, it may be desirable to have the transition temperature range be as broad as possible for precise tunability of the characteristic resonant frequency, and of the bandgap frequency, over a wide band.

In one embodiment of the present invention, the interface layer 120 is formed from a UV-cured thermosetting polymer material. These materials (thiol-enes, acrylates, methacrylates, urethanes, etc.) may exhibit orders of magnitude reduction in their bulk moduli above the glass transition temperature, have transition temperatures in the range of ~100° C. to 150° C., can have a broad or narrow temperature transition range, readily bond to a broad range of materials that may be utilized for the matrix phase 115 and fibers 125, and do not require a thermal cure cycle, which otherwise may complicate dimensional stability of a high aspect ratio interface layer 120. In other embodiments, thermoplastic, elastomeric, or non-UV cured thermosetting polymers may be utilized for the interface layer 120. Metallic or ceramic interface layer materials may be utilized if they possess a transition temperature in the range of interest (e.g., low melting temperature metals).

The matrix phase 115 in the composite may be selected for high toughness (e.g., Mode I fracture toughness >1.0 MPa-m^0.5) and good adhesion to the interface layer 120; these are characteristics that may generally be required of structural composite materials. In one embodiment of this invention, the matrix phase 115 is also formed from a UV-cured thermosetting polymer, thus achieving some or all of the benefits outlined above for the use of these materials as the interface layer material. Other polymeric materials, metals, and ceramics may also be utilized for the matrix phase material.

Example

A prototype system was analyzed for a 4.0 mm by 4.0 mm (height and width) periodic unit 110 with square packing in the phononic composite material. Each periodic unit included (e.g., consisted of) a circular 2.4 mm diameter copper fiber 125, a uniform 0.6 mm thickness UV-cured acrylate-based polymer interface layer with a Tg at 10° C., and a UV-cured thiol-ene matrix phase (filling, in this case, 36% of the volume of the periodic unit) with a spatial arrangement similar to that shown in FIG. 3A.

Figure 8:
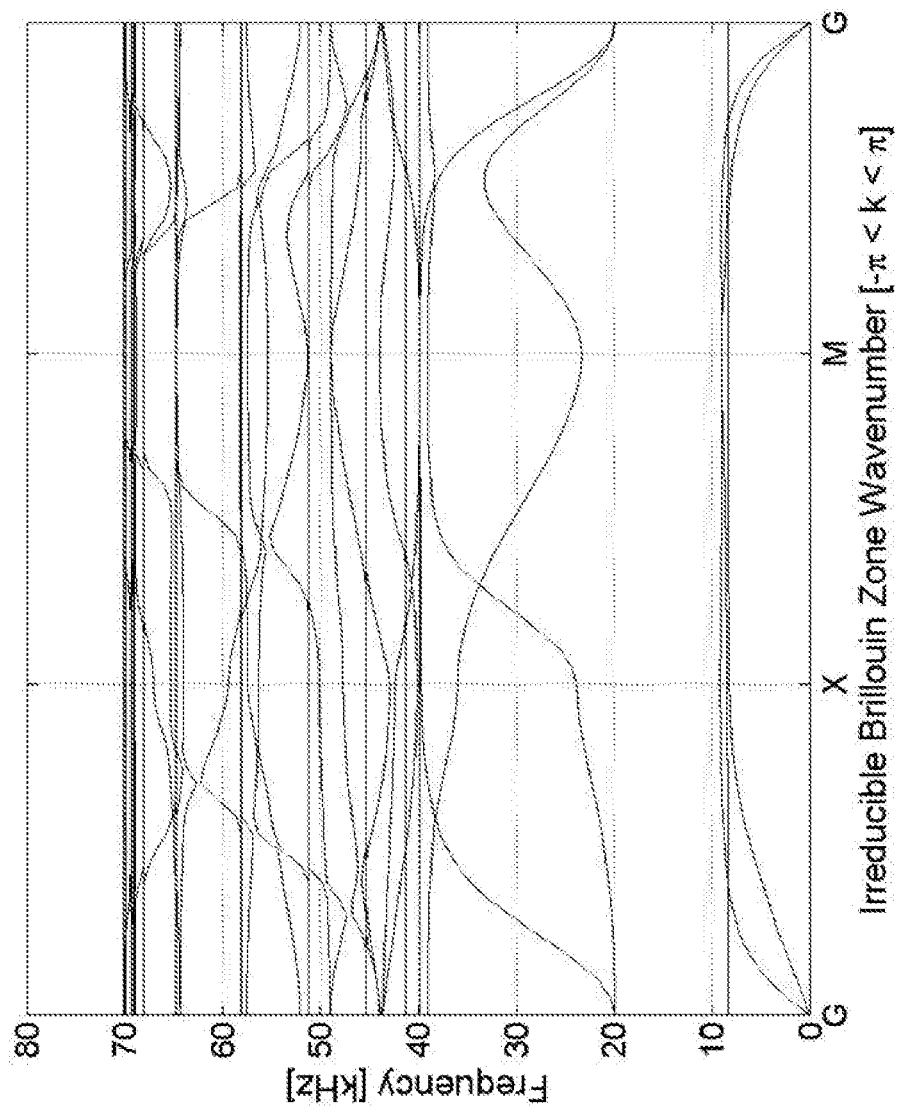
FIG. 8 is a graph of dispersion curves, generated by Bloch-Floquet analysis, for a phononic composite material, according to an embodiment of the present invention.

Phononic bandgaps in this prototype system were determined utilizing a Bloch-Floquet analysis to simulate the propagation of elastic waves in the two-dimensional medium. The composite microstructure was approximated as infinitely periodic within the plane of the cross section (the 2- and 3-directions as defined in FIGS. 1 and 3A) and prismatic in the out-of-plane 1-direction (as defined in FIGS. 1 and 3A) under plane strain conditions. A harmonic elastic wave was imposed on the periodic structure through appropriate boundary conditions, with the wave vector constrained to lie in the 2-3 plane of the cross section. The first 40 eigenvalues in the first irreducible Brillouin zone of the reciprocal lattice were then calculated and utilized to reconstruct dispersion curves of the composite structure in the frequency range of interest. These dispersion curves are shown in FIG. 8, with an elastic wave bandgap clearly observable between 9.2 and 20.0 kHz. Within this frequency range, elastic waves of any polarization are forbidden from propagating through the material.

Figure 9A:
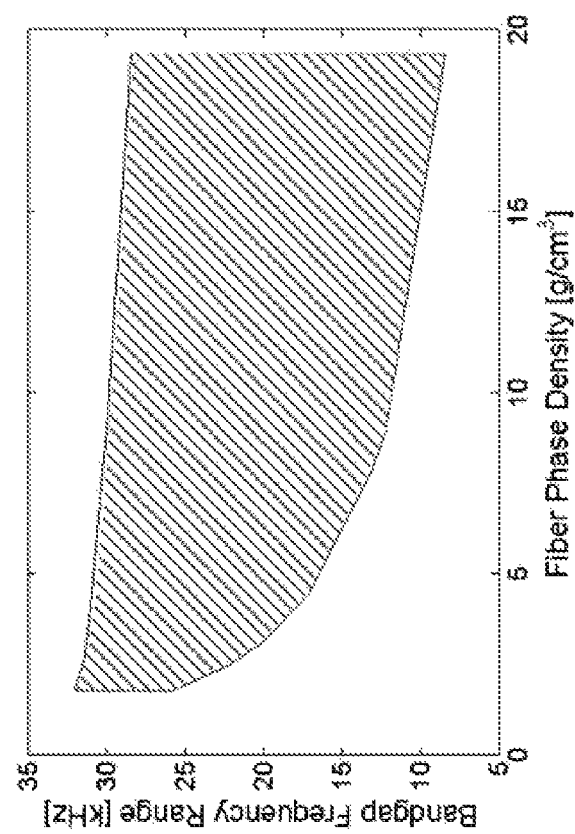
FIG. 9A is a graph of bandgap frequency and bandwidth as a function of the density of the fibers of a phononic composite material, according to an embodiment of the present invention.

The bandgap frequency may be further tuned through selection of the interface layer 120 and fiber 125 materials. The selection of these materials may also have an effect on the static mechanical properties, e.g., the strength and stiffness, of the phononic composite material. To illustrate the flexibility of the present invention for bandgap tuning, a periodic unit with square packing and geometry similar to the prototype system (rf=1.0 mm, ti=0.4 mm, periodic unit height and width=3.0 mm) was analyzed utilizing the same Bloch-Floquet approach for a series of different fiber materials. FIG. 9A shows the bandgap frequency and bandwidth as a function of the density of the fiber; higher density fiber materials (tungsten, copper, steel) generally reduce the characteristic resonant frequency of the fiber-interface system.

Figure 9B:
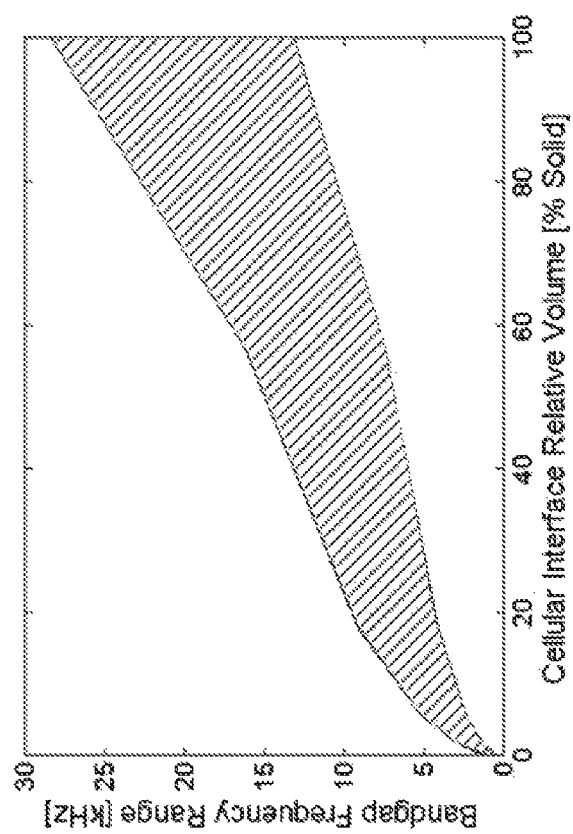
FIG. 9B is a graph of bandgap frequency and bandwidth as a function of interface layer relative density, according to an embodiment of the present invention.

The position of the bandgap may also be tailored by controlling the architecture of the interface layer. To demonstrate this phenomenon, the solid interface layer 120 in the prototype system of FIG. 8 (rf=1.2 mm, ti=0.6 mm, a=4.0 mm) was replaced with a cellular solid, e.g., polymer foam, of varying relative density (solid volume fraction); the effect on bandgap frequency and bandwidth is shown as a function of relative density in FIG. 9B. Another example of a cellular solid is a micro-truss or micro-lattice material. Utilizing a two-phase (air-solid) interface layer material (instead of a solid interface layer material) allows for lower stiffness, and bandgap frequencies lower than those that would be normally available by heating above the glass transition temperature alone. The use of a two-phase (air-solid) interface layer material may, however, also affect the load transfer capability between the matrix phase and the fiber, and the strength of the phononic composite material. In one embodiment, the interface layer is composed of a micro-truss or micro-lattice material as described in U.S. Pat. Nos. 7,382, 959 and 7,938,989, the entire contents of both of which are incorporated herein by reference.

Figures 10A, 10B:
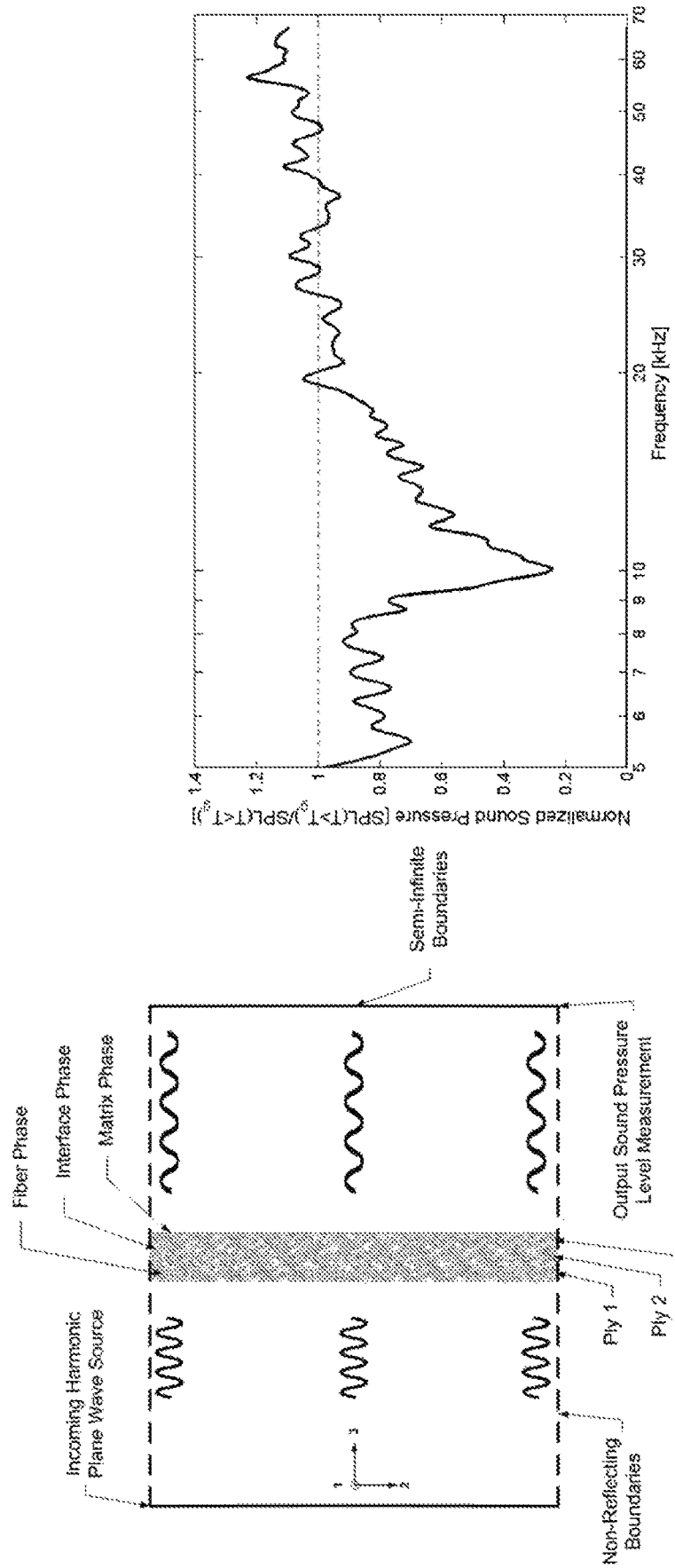
FIG. 10A is a cross-sectional view of a 3-layer (i.e., 3-ply) phononic composite material structure showing incoming and outgoing elastic waves in a simulation of impedance tube transmission loss, according to an embodiment of the present invention.
FIG. 10B is a graph of elastic wave transmission loss as a function of frequency for the structure of FIG. 10A, according to an embodiment of the present invention.

Embodiments of the present invention include unique phononic composite material designs which are not fully periodic in the plane of the structure (2-3 plane). For example, embodiments of the present invention were analyzed with a steady-state dynamics simulation of transmission losses in the structure to account for phenomena which were not incorporated in the Bloch-Floquet analysis, such as spatial variation, finite geometry and damping losses in the material. Plane wave transmission through the prototype structure of FIG. 8 with finite thickness (3 periodic unit "plies") was simulated as depicted in FIGS. 10A and 10B. This simulation was indicative of experimental measurements, such as impedance tube testing, which would typically be obtained for these materials. Referring to FIGS. 10A and 10B, transmission loss through the three unit cell phononic composite material was analyzed both below and above the glass transition temperature of the interface layer. The results are presented in FIG. 10B. In FIG. 10B, the sound pressure level for the resonant system (T>Tg) has been normalized by the sound pressure level measured for the non-resonant or locked fiber system (T<Tg). The effect of the locally resonant behavior of the fiber-interface system on wave transmission through the structure can be observed from this normalized transmission loss curve as a function of frequency. Below the Tg (stiff interface layer), no resonance of the fiber-interface system is observed and normalized transmission loss is roughly equal to one across the frequency band. When the structure is heated above its Tg and the interface layer stiffness is reduced per FIG. 5, a loss of transmission centered around a bandgap frequency of 10 kHz is evident from the dip in the normalized loss curve. This result is in good agreement with the Bloch-Floquet analysis of FIG. 8, although the incorporation of finite geometry and intrinsic material damping have reduced the width of the bandgap, particularly at the high frequency end, compared to the width predicted for an infinitely periodic, purely elastic system.

Figures 11A, 11B:
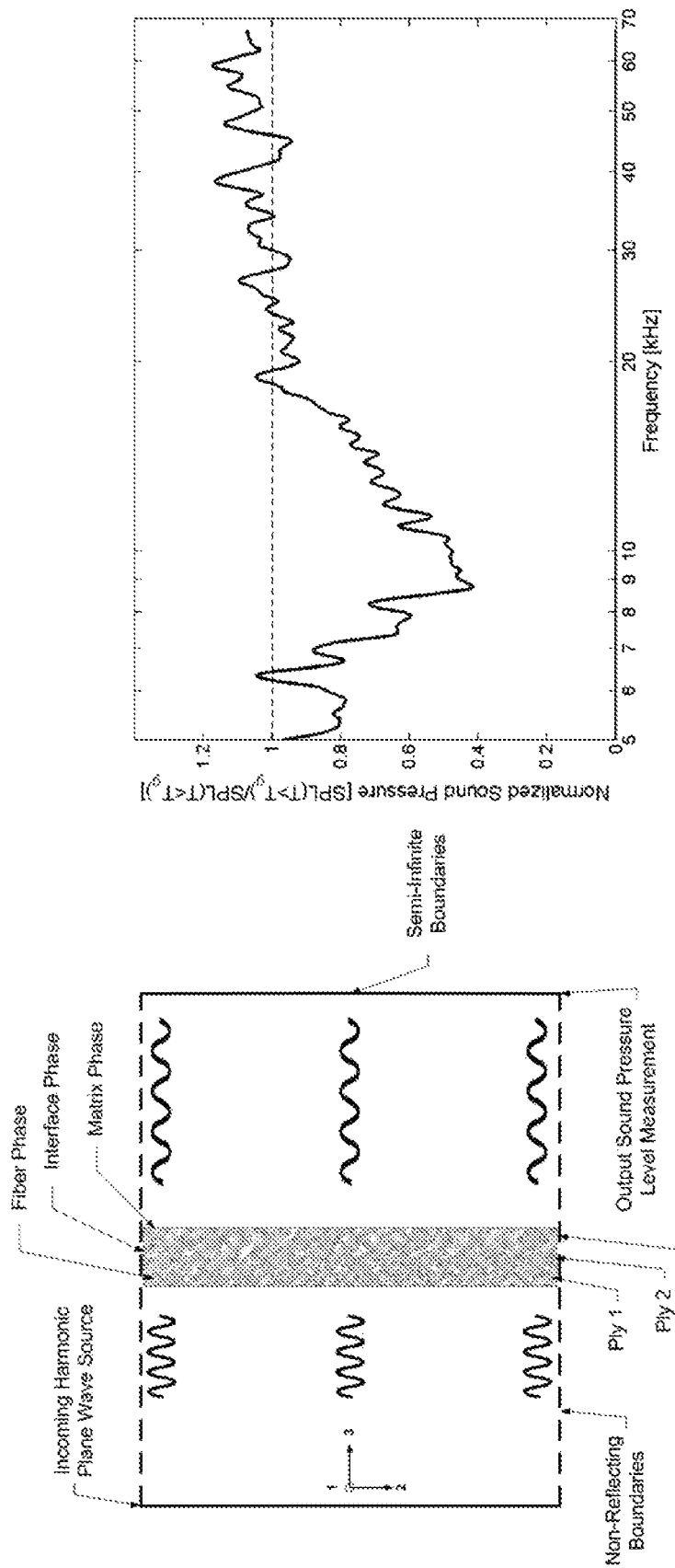
FIG. 11A is a cross-sectional view of a 3-layer (i.e., 3-ply) phononic composite material structure with different periodic unit dimensions in the three plies, showing incoming and outgoing elastic waves in a simulation of impedance tube transmission loss, according to an embodiment of the present invention.
FIG. 11B is a graph of elastic wave transmission loss as a function of frequency for the structure of FIG. 11A, according to an embodiment of the present invention.

To increase the width of the bandgap, multiple composite phononic crystals with different periodic characteristics may be combined into a system as depicted in FIGS. 11A and 11B. This embodiment again employs three periodic units through the thickness of the composite, but the periodic units in each of the layers have different geometric parameters. In this particular design, the fiber, interface layer, and matrix phase materials are the same as in the simulation of FIGS. 10A and 10B, but the geometric parameters vary between each adjacent ply. In particular, the first ply has, in each periodic unit, a fiber diameter of 2.4 mm, an interface layer thickness of 0.6 mm, and a periodic unit height and width of 4.0 mm. The second ply has, in each periodic unit, a fiber diameter of 3.0 mm, an interface layer thickness of 0.6 mm, and a periodic unit height and width of 4.6 mm. The third ply has, in each periodic unit, a fiber diameter of 4.0 mm, an interface layer thickness of 0.6 mm, and a periodic unit height and width of 5.6 mm. Normalized transmission loss as a function of frequency for this system is shown in FIG. 11B, with the change in response of the phononic composite material above and below the Tg being evident. Comparing the results of FIGS. 10B and 11B shows that tuning of the bandwidth is possible at the cost of maximum transmission loss, since all periodic units in the finite thickness structure no longer have the same characteristic resonant frequency. Similar results may be obtained in other embodiments by varying the composition of the fiber or interface layers throughout the phononic composite material to disperse the characteristic resonant frequencies (and increase the bandwidth) or by arranging for the temperature to vary across the phononic composite material structure.

Embodiments of the present application may find use in a variety of applications. Suppression of elastic waves in the acoustic range (20 Hz-20 kHz) is of interest in applications where harmonic excitation sources and occupants co-exist, or where low mass, high stiffness, and vibration damping at frequencies above the audible range (>20 kHz) are of interest. For example, a phononic composite material according to embodiments of the present invention may be utilized in engine housings (nacelles, cowlings, fairings), fixed wing or rotorcraft fuselage structures, containment structures for electrical components (transformers, generators), structural panels (door, hood, roof, body), floorboards, front-of-dash components, or recreational equipment, such as golf club shafts, tennis racquets, bicycle frames, snow or water skis, or snowboards.

It will be understood that, although the terms "first", "second", "third", etc., may be utilized herein to describe various elements, components, regions, layers and/or sections, these elements, components, regions, layers and/or sections should not be limited by these terms. These terms are only utilized to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be utilized herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors utilized herein should be interpreted accordingly. In addition, it will also be understood that when a layer is referred to as being "between" two layers, it can be the only layer between the two layers, or one or more intervening layers may also be present.

The terminology utilized herein is for the purpose of describing particular embodiments only and is not intended to be limiting of the inventive concept. As utilized herein, the terms "substantially", "about", and similar terms are utilized as terms of approximation and not as terms of degree, and are intended to account for the inherent deviations in measured or calculated values that would be recognized by those of ordinary skill in the art. As utilized herein, the term "major component" means a component constituting at least half, by weight, of a composition, and the term "major portion", when applied to a plurality of items, means at least half of the items.

As utilized herein, the singular forms "a", "an" and "the" are intended to include the plural forms as well, unless the context clearly indicates otherwise. It will be further understood that the terms "comprises" and/or "comprising", when utilized in this specification, specify the presence of stated features, integers, steps, operations, elements, and/or components, but do not preclude the presence or addition of one or more other features, integers, steps, operations, elements, components, and/or groups thereof. As utilized herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of present invention". Also, the term "exemplary" is intended to refer to an example or illustration.

As used herein, the terms "use", "using", and "used" may be considered synonymous with the terms "utilize", "utilizing", and "utilized", respectively. It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a phononic composite material with internal resonant phases have been specifically described and illustrated herein, many modifications and variations will be apparent to those skilled in the art. Accordingly, it is to be understood that a phononic composite material with internal resonant phases constructed according to principles of this invention may be embodied other than as specifically described herein. The invention is also defined in the following claims, and equivalents thereof.

What is claimed is:

1. A phononic composite material comprising:
   a plurality of periodic units,
   each of the periodic units having a length in a first direction, a width in a second direction, and a periodic unit height in a third direction, the length being at least 10 times greater than the height and at least 10 times greater than the width;
   each of the periodic units comprising a fiber extending along the first direction, an interface layer surrounding the fiber, and a matrix phase surrounding the interface layer, the interface layer being in a first state when at a first temperature greater than a glass transition temperature of the interface layer;
   the periodic units being contiguous with one another to form a structure, the structure having a structure height and being periodic in the second direction; and
   the periodic unit height, the width, a Young's modulus of the interface layer in the first state, an average thickness of the interface layer, an average diameter of the fiber, a density of the fiber, and the structure height being configured with each other to block propagating elastic waves in arbitrary directions perpendicular to the first direction over a contiguous range of frequencies in the phononic composite material, wherein the phononic composite material further comprises a source of heat configured to raise a temperature of the interface layer of a periodic unit of the plurality of periodic units,
the interface layer is in a second state when at a second temperature less than the glass transition temperature of the interface layer,
the phononic composite material is configured to block elastic waves in the first state and to transmit elastic waves in the second state, and
the Young's modulus of the interface layer in the second state is at least 3 times greater than the Young's modulus of the interface layer in the first state.

2. The phononic composite material of claim 1, wherein the fiber comprises, as major component, a discontinuous material selected from the group consisting of short fibers, particulates, flakes, and combinations thereof.

3. The phononic composite material of claim 1, wherein the fiber comprises, as a major component, a material selected from the group consisting of tungsten or its alloys, copper or its alloys, steel, glass, carbon, alumina, silicon carbide, aluminum, boron, and combinations thereof.

4. The phononic composite material of claim 1, wherein the matrix phase comprises, as a major component, a material selected from the group consisting of thermosetting polymers, thermoplastic polymers, elastomeric polymers, metals, metal alloys, engineered ceramics, and combinations thereof.

5. The phononic composite material of claim 1, wherein the interface layer comprises, as a major component, a material selected from the group consisting of thermosetting polymers, thermoplastic polymers, elastomeric polymers, and combinations thereof.

6. The phononic composite material of claim 1, wherein the interface layer comprises, as a major component, a cellular solid.

7. The phononic composite material of claim 1, wherein a periodic unit of the plurality of periodic units contains more than one interface layer.

8. The phononic composite material of claim 1, wherein a periodic unit of the plurality of periodic units has a first cross section at a first point along the length of the periodic unit and a second cross section at a second point along the length of the periodic unit, the first cross section being different from the second cross section.

9. The phononic composite material of claim 1, wherein the plurality of periodic units comprises a first plurality of periodic units each having a first cross section and a second plurality of periodic units each having a second cross section, the first cross section being different from the second cross section.

10. The phononic composite material of claim 1, wherein a first periodic unit of the plurality of periodic units has a value for a parameter selected from the group consisting of the periodic unit height, the width, an average thickness of the interface layer, and an average diameter of the fiber, differing from the value of the parameter for a second periodic unit of the plurality of periodic units.

11. The phononic composite material of claim 1, wherein the interface layer comprises, as a major component, a UV-curable photopolymer.

12. The phononic composite material of claim 1, wherein the source of heat is configured to raise a temperature of the interface layer above the glass transition temperature of the interface layer.

13. The phononic composite material of claim 1, wherein the fiber of a first periodic unit of the plurality of periodic units comprises, as a major component, a first material, and the fiber of a second periodic unit of the plurality of periodic units comprises, as a major component, a second material, the first material being different from the second material.

14. The phononic composite material of claim 1, wherein the interface layer of a first periodic unit of the plurality of periodic units comprises, as a major component, a first material, and the interface layer of a second periodic unit of the plurality of periodic units comprises, as a major component, a second material, the first material being different from the second material.

15. A phononic composite material comprising:
a plurality of periodic units,
each of the periodic units having a length in a first direction, a width in a second direction, and a periodic unit height in a third direction, the length being at least 10 times greater than the height and at least 10 times greater than the width;
each of the periodic units comprising a fiber, an interface layer surrounding the fiber, and a matrix phase surrounding the interface layer, the interface layer being in a first state when at a first temperature greater than a glass transition temperature of the interface layer;
the periodic units being contiguous with one another to form a structure, the structure having a structure height and being periodic in the second direction; and
the periodic unit height, the width, a Young's modulus of the interface layer in the first state, an average thickness of the interface layer, an average diameter of the fiber, a density of the fiber, and the structure height being configured with each other to block propagating elastic waves over a contiguous range of frequencies in the phononic composite material,
wherein the phononic composite material further comprises a source of heat configured to raise a temperature of the interface layer of a periodic unit of the plurality of periodic units, and
wherein the fiber of the periodic unit comprises a conductive material, and the source of heat comprises a source of electrical current configured to drive an electrical current through the fiber of the periodic unit.

16. The phononic composite material of claim 1, wherein the interface layer has an inner boundary in contact with the fiber and an outer boundary in contact with the matrix phase, and
the fiber is isolated from the matrix phase by the interface layer.

17. The phononic composite material of claim 1, wherein the periodic units are packed with hexagonal packing.

18. A phononic composite material comprising:
a plurality of periodic units,
each of the periodic units having a length in a first direction, a width in a second direction, and a periodic unit height in a third direction, the length being at least 10 times greater than the height and at least 10 times greater than the width;
each of the periodic units comprising a fiber extending along the first direction, an interface layer surrounding the fiber, and a matrix phase surrounding the interface layer, the interface layer being in a first state when at a first temperature greater than a glass transition temperature of the interface layer;
the periodic units being contiguous with one another to form a structure, the structure having a structure height and being periodic in the second direction; and
the periodic unit height, the width, a Young's modulus of the interface layer in the first state, an average thickness of the interface layer, an average diameter of the fiber, a density of the fiber, and the structure height being configured with each other to block propagating elastic waves in arbitrary directions perpendicular to the first direction over a contiguous range of frequencies in the phononic composite material, wherein the phononic composite material further comprises a source of heat configured to raise a temperature of the interface layer of a periodic unit of the plurality of periodic units, and the source of heat comprises a source of radio frequency or microwave energy.

19. A phononic composite material comprising:

a plurality of periodic units, each of the periodic units having a length in a first direction, a width in a second direction, and a periodic unit height in a third direction, the length being at least 10 times greater than the height and at least 10 times greater than the width;

each of the periodic units comprising a fiber, an interface layer surrounding the fiber, and a matrix phase surrounding the interface layer, the interface layer comprising, as a major component, a material selected from metal alloys, engineered ceramics, and combinations thereof;

the periodic units being contiguous with one another to form a structure, the structure having a structure height and being periodic in the second direction; and the periodic unit height, the width, a Young's modulus of the interface layer in a first state, an average thickness of the interface layer, an average diameter of the fiber, a density of the fiber, and the structure height being configured with each other to block propagating elastic waves in arbitrary directions perpendicular to the first direction over a contiguous range of frequencies in the phononic composite material, wherein the thickness of the interface layer is equal to or less than a radius of the fiber, wherein the interface layer and the matrix phase are composed of different materials, and wherein the phononic composite material further comprises a source of heat configured to raise a temperature of the interface layer of a periodic unit of the plurality of periodic units.

* * * * *